United States Patent [19]

Aoki

[11] 4,128,082

[45] Dec. 5, 1978

[54] ELECTRONIC FUEL INJECTION CONTROL DEVICE

[75] Inventor: Keiji Aoki, Susono, Japan

[73] Assignee: Toyota Jidosha Kogyo Kabushiki Kaisha, Toyota, Aichi, Japan

[21] Appl. No.: 835,167

[22] Filed: Sep. 21, 1977

[30] Foreign Application Priority Data

Mar. 18, 1977 [JP] Japan .............................. 52-31976[U]

[51] Int. Cl.² ............................................. F02P 3/02
[52] U.S. Cl. ............................. 123/32 EA; 123/148 E; 123/179 BG
[58] Field of Search .......... 123/32 EA, 148 E, 117 R, 123/32 EF, 32 ED, 179 B, 179 BG, 179 L

[56] References Cited

U.S. PATENT DOCUMENTS

| 3,680,532 | 8/1972 | Omori | 123/179 L |
|---|---|---|---|
| 3,821,944 | 7/1974 | Miki et al. | 123/179 BG |
| 3,853,106 | 12/1974 | Canup | 123/148 E |
| 4,008,698 | 2/1977 | Gartner | 123/148 E |
| 4,016,433 | 4/1977 | Brooks | 123/179 BG |
| 4,027,641 | 6/1977 | Möder | 123/32 EA |
| 4,036,199 | 7/1977 | Chateau | 123/148 E |
| 4,040,397 | 8/1977 | Leichle | 123/32 EA |
| 4,051,827 | 10/1977 | Capurka et al. | 123/148 E |

Primary Examiner—Charles J. Myhre
Assistant Examiner—R. A. Nelli
Attorney, Agent, or Firm—Stevens, Davis, Miller & Mosher

[57] ABSTRACT

Disclosed is an electronic fuel injection control device for an internal combustion engine comprising an electronic circuit requiring a power-supply source of fixed voltage. The control device comprises a C-MOS type generating means for generating an electric control signal having a predetermined pulse width, and a switching means. The switching means feeds injection valves of the engine with the control signal provided from the generating means, when the engine is being started.

6 Claims, 4 Drawing Figures

ELECTRONIC FUEL INJECTION CONTROL DEVICE

BACKGROUND OF THE INVENTION

The invention relates fo an electronic fuel injection control device for an internal combustion engine and, particularly, to a fuel injection control device comprising an electronic circuit requiring a power source of fixed voltage.

A fuel injection control device for an internal combustion engine carries out calculations based on various detecting signals indicating the condition of the engine. Such detecting signals are, for example, an air flow signal indicating the amount of air which is introduced into the engine and an engine speed signal indicating the number of revolutions per minute of the engine. After carrying out the calculations, the control device controls the opening time of fuel injection valves for supplying fuel to the cylinders of the engine.

The conventional control devices of the above described kind are divided into two types. One of which is an analogue type and the other of which is a digital type. Control devices of the digital type ordinarily comprise a digital electronic circuit including a microprocessor, a digital memory element and the like. The digital electronic circuit requires a 5-volts d.c. power source of fixed voltage for its operation.

An automobile battery is ordinarily used as the power source for the electronic circuit of the fuel injection control device which controls injection amount of the fuel supplied to an automobile internal combustion engine. However, the terminal voltage of the automobile battery is greatly changed depending on the running condition of the engine. Especially, at the start of the operation of the engine, a large current is supplied to a starter motor of the engine and, therefore, the terminal voltage of the battery is greatly decreased. Furthermore, when the temperature of the outside air is low, or if the battery is degraded, the terminal voltage of the battery at the start of the operation of the engine is often lower than 5-volts.

Accordingly, in a conventional control device of this type, the occurrence of erroneous operations at the start of the operation of the engine has heretofore been prevented by elevating the battery voltage, adjusting the elevated voltage to a predetermined fixed voltage and feeding the fixed voltage to the electronic circuit, by using a d.c. to d.c. voltage converter (DC-DC converter). However, such a DC-DC converter is very expensive and its size is large. Accordingly, the loading an automobile with the DC-DC converter involves various problems, which have impeded utilization of a digital electronic fuel control device of an internal combustion engine for an automobile.

BRIEF SUMMARY OF INVENTION

It is an object of the present invention to provide an electronic fuel injection control device for an internal combustion engine in which fuel injection is correctly controlled even at the start of the operation of the engine without using a DC-DC converter.

According to the present invention, the electronic fuel injection control device of an internal combustion engine comprises: a means for detecting a condition of the engine and for generating an electrical signal indicative of the condition of the engine, and; an electronic circuit for calculating a fuel injection period of the injection valves in accordance with the electrical signal and for supplying a control signal based on the calculated fuel injection period to each the driving means. The control device further comprises a means for generating a control signal having a predetermined pulse width. This generating means consists of a C-MOS type element. The control device further comprises a switching means for feeding the driving means of the injection valves with the control signal provided from the generating means, when the engine is being started.

In the preferred embodiment, the switching means comprises a common output terminal connected to the driving means of the injection valves, a first input terminal connected to an output terminal of the electronic circuit, and a second input terminal connected to an output terminal of the generating means. This switching means is actuated so as to connect the common output terminal with the second input terminal when the engine is being started.

The generating means, in a further preferred embodiment, is triggered by a signal representing a crank angle position of the engine, for example an ignition signal, so as to generate the control signal corresponding to the triggering signal.

The above and other related objects and features of the present invention will be apparent from the description set forth below with reference to the accompanying drawings, and from the appended claims which disclose the novelty of the invention.

DETAILED DESCRIPTION

Figure 1:
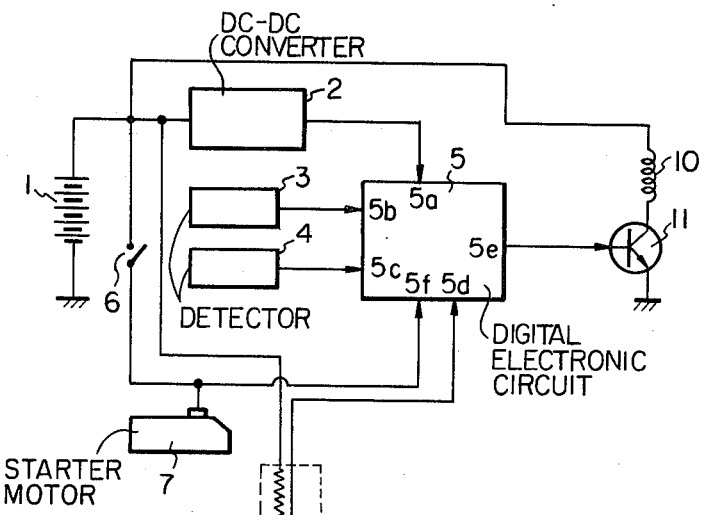
FIG. 1 is a block diagram of a conventional digital electronic fuel injection control device for an internal combustion engine.

Referring to the attached drawings, in FIG. 1 which shows the conventional control device, reference numeral 1 represents a battery, 2 a DC-DC converter, 3 a detector for detecting the amount of air introduced into an internal combustion engine and 4 a detector for detecting the vacuum level in an intake pipe of the engine; 5 represents a digital electronic circuit for calculating the fuel injection period, which includes a microprocessor, a digital memory element, and the like; 7 represents a starter motor of the engine, 6 a switch for driving the starter motor 7, 8 an ignitor and 9 an ignition plug; 10 represents a solenoid coil of a fuel injection valve and 11 a switching transistor for driving the solenoid coil 10.

While the engine is in the running state, the air flow signal, the vacuum level signal and the engine speed signal are applied to the input terminals 5b, 5c and 5d of the digital electronic circuit 5 from the detector 3, the detector 4, and the ignitor 8. Calculations are then carried out in the digital electronic circuit 5 based on these signals. The calculations are carried out to determine the amount of fuel to be supplied to the engine, so as to attain a predetermined air-fuel ratio. A fuel injection pulse signal, having a pulse width based on results of the calculations, is applied to a controlling terminal of the transistor 11 from an output terminal 5e of the digital electronic circuit. As a result, the transistor 11 and the injection valve 10 are actuated to supply the aforementioned amount of the fuel into the engine cylinder.

Figure 3:
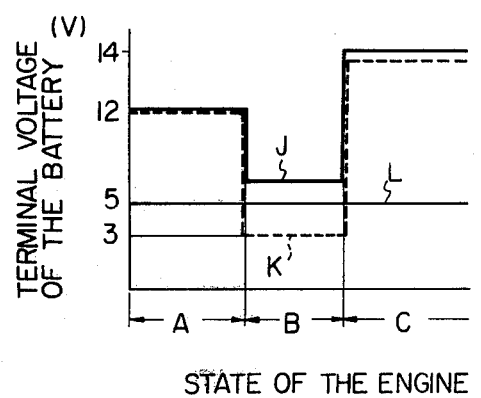
FIG. 3 is a diagram depicting the characteristics of the battery terminal voltage.

At the start of the operation of the engine, since a large current is applied to the starter motor 7 as pointed out hereinbefore, the terminal voltage of the battery 1 is drastically reduced. FIG. 3 illustrates characteristics of the battery terminal voltage at normal temperatures (J) and at low temperatures (K). In FIG. 3, the symbols A, B and C represent the state when the engine is stopped, the state when the engine is being started, and the state when the engine is running, respectively. As will be seen from FIG. 3, when the engine is being started, especially when the temperature of the outside air is low, the terminal voltage is lower than the required voltage L (5-volts) for the digital electronic circuit 5. Therefore, in the conventional device, the terminal of the battery 1 is connected to a power input terminal 5a of the digital electronic circuit 5 through the DC-DC converter 2, so that a constant voltage of 5-volt can be supplied to the digital electronic circuit 5 even at the start of the operation of the engine. By this arrangement, the digital electronic circuit in the conventional device is allowed to operate normally even at the start of the operation of the engine.

When the engine is being started, namely when the starter motor driving switch 6 is being closed to drive the starter motor 7 and a voltage is applied to an input terminal 5f of the digital electronic circuit 5, a fuel injection pulse signal having a predetermined fixed pulse width is put out from the output terminal 5e of the digital electronic circuit 5. This fuel injection pulse signal is produced irrespective of the amount of air introduced into the engine, the vacuum level of the intake pipe of the engine or the engine speed. This is because, at the start of the operation of the engine the amount of intake air is too small to detect, the engine speed is very low and the vacuum level of the intake pipe is greatly changed, and accordingly, injection of the fuel cannot be correctly controlled.

Figure 2:
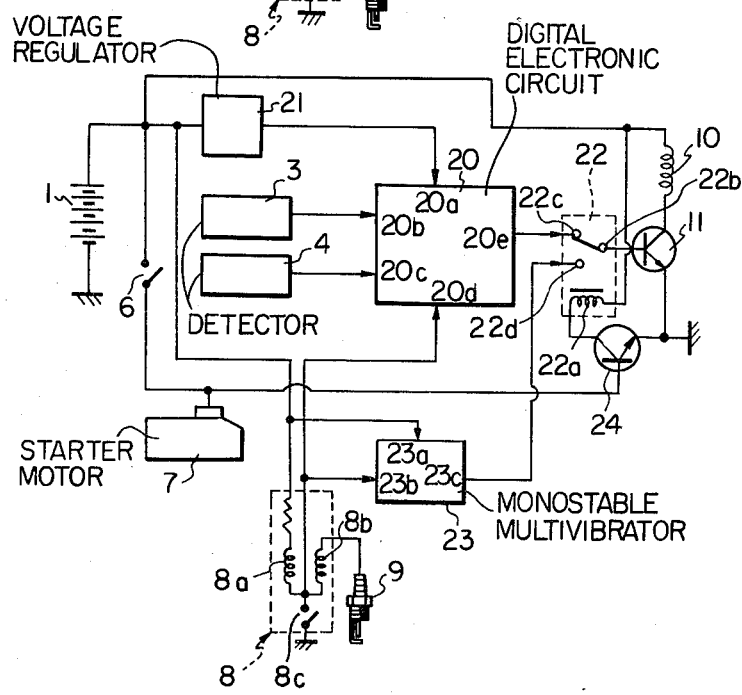
FIG. 2 is a block diagram of an embodiment of the digital electronic fuel injection control device according to the present invention.

In one embodiment of the control device according to the present invention, as illustrated in FIG. 2, a power input terminal 20a of a digital electronic circuit 20 for calculation of the fuel injection period is connected to the terminal of the battery 1 through a d.c. voltage regulator 21. Signal input terminals 20b, 20c and 20d of the digital electronic circuit 20 are connected, respectively, to an output terminal of the detector 3 for detecting the amount of air introduced into the engine, to an output terminal of the detector 4 for detecting the vacuum level in the intake pipe of the engine and to an output terminal of the ignitor 8. The detector 3 is disposed in the intake system of the engine. This detector 3 may have such a structure that a plate is displaced by the force of a stream of air introduced into the engine. The force F of the air stream is shown as $F\alpha \frac{1}{2}\rho V^2$, in which $\rho$ represents the density of air and V denotes the speed of the air stream. The quantity of the displacement of the plate is converted to a voltage by a potentiometer which is coupled to the plate, so as to obtain a signal indicating the amount of air introduced into the engine. In another embodiment, the detector 3 may be a hot wire anemometer customarily used for the measurement of the speed of fluids. The detector 4 is mounted on the intake pipe of the engine, and this detector 4 may have a structure utilizing a piezo-electric effect or a structure modifying a strain gauge. The output terminal of the ignitor 8 is connected to a common junction point for a primary winding 8a of an ignition coil of the ignitor 8, a secondary winding 8b of the ignition coil and a contact point 8c of the ignitor. The ignitor 8 generates a pulse signal corresponding to the number of the rotations per minute of the engine. Based on this pulse, the number of rotations per minute, namely the speed of the engine, is calculated in the digital electronic circuit 20.

The starter motor 7 for starting the engine is connected to the terminal of the battery 1 through the starter motor driving switch 6. The terminal of the switch 6 on the side of the starter motor 7 is connected to the base of a switching transistor 24 for actuating an electromagnetic relay 22. A collector and an emitter terminal of the switching transistor 24 and a solenoid coil 22a of the relay 22 are connected in series to each other between the terminals of the battery 1. A movable contact 22b of the relay 22 is connected to the base of a switching transistor 11 for actuating the solenoid coil 10 for driving the fuel injection valve. This movable contact 22b is normally in contact with a fixed contact 22c connected to an output terminal 20e of the digital electronic circuit 20. The other fixed contact 22d of the relay 22 is connected to an output terminal 23c of a monostable multivibrator 23 of the C-MOS type (the Complementary Metal Oxide Semiconductor type). As input terminal 23b of the monostable multivibrator 23 is connected to the above-mentioned output terminal of the ignitor 8 and a power voltage input terminal 23a of the monostable multivibrator 23 is connected to the terminal of the battery 1.

As is well known in the art, the C-MOS type element is characterized in that it operates stably even under great variations of the power voltage supplied thereto. Accordingly, even if the terminal voltage of the battery 1 is greatly changed, the monostable multivibrator 23 of C-MOS type performs predetermined functions stably.

The digital electronic circuit 20 is a so-called digital microcomputer provided with a microprocessor, a digital memory element, and the like.

Figure 4:
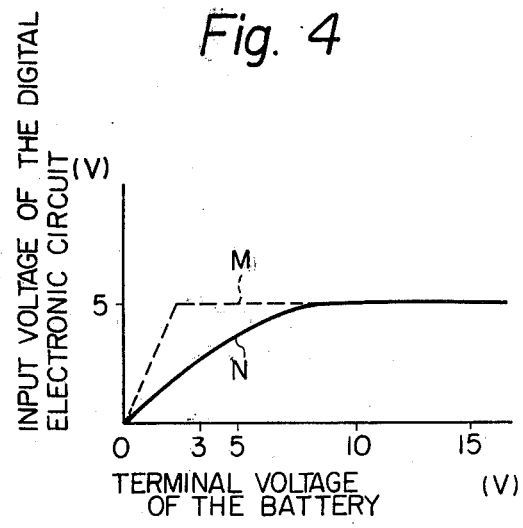
FIG. 4 is a diagram depicting the characteristics of a d.c. fixed voltage circuit.

The d.c. voltage regulator 21 is an ordinary stabilizing circuit comprising a zener diode and a resistor. This voltage regulator 21 is utilized for preventing the input voltage, i.e., the power input terminal voltage, from becoming greater than 5 volts. The input-output voltage characteristic of this voltage regulator 21 is indicated by solid line N in FIG. 4. As is seen from this figure, the voltage regulator 21 is not required to stabilize the output voltage thereof strictly to 5 volts even if the input voltage thereof is drastically reduced. In FIG. 4, the broken line M shows the input-output voltage characteristic of the DC-DC converter used in the conventional device (shown in FIG. 1).

The electromagnetic relay 22 is one embodiment of the switching means connecting the output terminal 23c of the monostable multivibrator 23 to the base of the transistor 11 at the start of the operation of the engine and connecting the output terminal 20e of the digital electronic circuit 20 to the base of the transistor 11 during periods. Of course, in another embodiment of the present invention, this switching means may be formed of a semiconductor element.

The operation of the fuel injection control device according to the foregoing embodiment of the present invention will now be described.

When the engine is in the normal running state, the movable contact 22b of the relay 22 is placed in contact with the fixed contact 22c. Therefore, in this state, the operation of the present control device is the same as the operation of the conventional device.

However, at the start of the operation of the engine, since the starter motor driving switch 6 is closed, a voltage is applied to the base of the switching transistor 24 and, then, the transistor 24 becomes conductive. As a result the solenoid coil 22a of the relay 22 is actuated to cause the movable contact 22b to fall into contact with the fixed contact 22d. The monostable multivibrator 23 is triggered by an ignition signal applied from the ignitor 8 and, then, generates a pulse signal having a predetermined pulse width. This pulse signal is applied from the output terminal 23c of the monostable multivibrator 23 to the base of the switching transistor 11 through the contacts 22d and 22b of the relay 22. Accordingly, the solenoid coil 10 of the fuel injection valve (not shown) is actuated and the fuel injection valve is opened for a time corresponding to the pulse width of the above pulse signal. Thus, the fuel is injected into the engine cylinder. The pulse width of the output pulse signal of the monostable multivibrator 23 is preliminarily determined so that an optimum time for injection of the fuel can be obtained at the start of the operation of the engine. As pointed out hereinbefore, the terminal voltage of the battery 1 is drastically lowered when the cellmotor 7 is driven. However, since the monostable multivibrator 23 is of the C-MOS type, a pulse signal having the predetermined pulse width can be supplied to the injection valve irrespective of reduction of the power voltage in the control device of the present invention.

When the starter motor driving switch 6 is opened after the start of the operation of the engine, the movable contact 22b of the relay 22 is switched to the side of the fixed contact 22c. Therefore, in this case, the output signal of the digital electronic circuit 20 is applied to the base of the transistor 11 and normal fuel injection control is carried out.

As will be apparent from the foregoing description, the digital electronic circuit 20 in the control device of this invention is used only when the terminal voltage of the battery 1 is relatively normal, namely when the starter motor 7 is not driven. Accordingly, in general, it is sufficient for the voltage regulator 21 to have characteristics as indicated by the solid line N in FIG. 4, and a DC-DC converter having excellent characteristics as indicated by the broken line in FIG. 4 need not be used in the control device of the present invention. Therefore, the cost of the control device according to the present invention can be remarkably reduced and the size of the control device can be minimized. As a result, introduction of a digital electronic control system for controlling the fuel injection of an automobile can be accomplished very easily.

In the control device illustrated in the foregoing embodiment, the fuel injection is controlled by detecting the amount of air introduced into the engine, the vacuum level in the intake pipe of the engine and the engine speed. In the present invention, however, the fuel injection may be controlled according to other systems, for example, a system for detecting the amount of air introduced into the engine and the engine speed, so long as the fuel injection period is calculated by an electronic circuit requiring a fixed voltage power source.

Furthermore, a digital counter and the like of the C-MOS type may be used as the control signal generating means in the control device according to the present invention, instead of the above-mentioned multivibrator of the C-MOS type.

What is claimed is:

1. An electronic fuel injection control device of an internal combustion engine having fuel injection valves disposed upstream of intake valves of said engine and driving means of said injection valves, comprising:
    a means for detecting a condition of said engine and for generating an electrical signal being indicative of said condition;
    an electronic circuit for calculating a fuel injection period of said injection valves in accordance with said electrical signal, and for supplying a control signal based on said calculated fuel injection periods to each said driving means;
    a means for generating a control signal having a predetermined pulse width, said generating means consisting of a C-MOS type element, and;
    a switching means for feeding said driving means of said injection valves with said control signal provided from said generating means, when said engine is being started.

2. An electronic fuel injection control device as claimed in claim 1, wherein said switching means comprises a common output terminal connected to said driving means of said injection valves, a first input terminal connected to an output terminal of said electronic circuit, and a second input terminal connected to an output terminal of said generating means, and said switching means is actuated so as to connect said common output terminal with said second input terminal when said engine is being started.

3. An electronic fuel injection control device as claimed in claim 1, wherein said generating means is triggered by a signal representing a crank angle position of said engine, so as to generate said control signal corresponding to said triggering signal.

4. An electronic fuel injection control device as claimed in claim 3, wherein said triggering signal is an ignition signal.

5. An electronic fuel injection control device as claimed in claim 3, wherein said generating means consists of a C-MOS type monostable multivibrator.

6. An electronic fuel injection control device as claimed in claim 3, wherein said generating means consists of a C-MOS type digital counter.

* * * * *